Dec. 9, 1924.
G. A. HORN
METHOD OF DECORATING GLASSWARE
Filed April 7, 1924
1,518,930
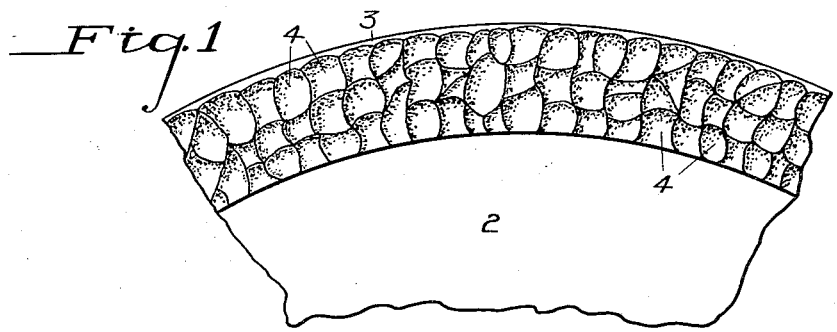
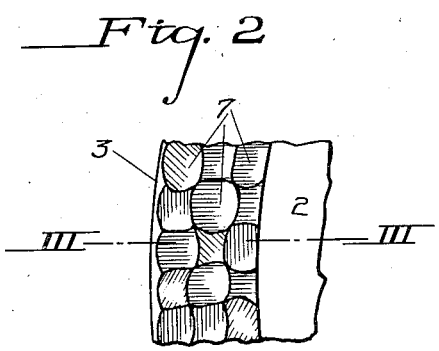
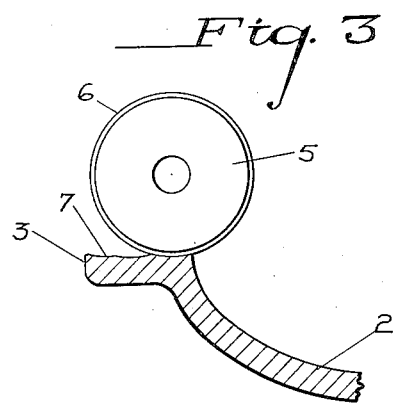
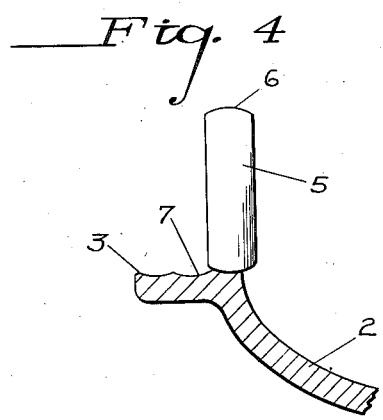
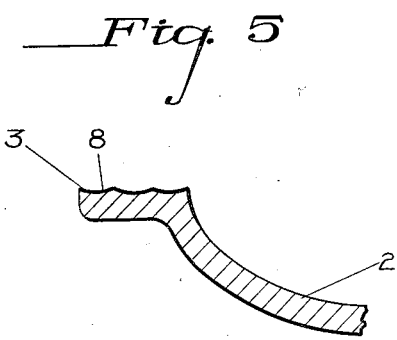
INVENTOR
Gustav A. Horn
by O. M. Clarke
Attorney Patented Dec. 9, 1924.

1,518,930

UNITED STATES PATENT OFFICE.

GUSTAV A. HORN, OF JEANNETTE, PENNSYLVANIA, ASSIGNOR TO WESTMORELAND SPECIALTY COMPANY, OF GRAPEVILLE, PENNSYLVANIA, A CORPORATION OF PENNSYLVANIA.

METHOD OF DECORATING GLASSWARE.

Application filed April 7, 1924. Serial No. 704,718.

*To all whom it may concern:*

Be it known that I, GUSTAV A. HORN, a citizen of the United States, residing at Jeannette, in the county of Westmoreland and State of Pennsylvania, have invented certain new and useful Improvements in Methods of Decorating Glassware, of which the following is a specification.

My invention is an improvement in the art of decorating glassware, and consists in the process of grinding the surface and covering it with a pigment, in imitation of hammered silver, gold, or other metal.

In such "hammered" metal ware, the surface is formed by hammering an area in a continuous series of irregularly shaped units, merged together to form a continuous surface of small irregular, slightly concave surfaces or facets. These are each individual, although generally similar, varying in size and shape, and each having its own reflecting value, dependent on the surface of each individual unit.

In my invention, a smooth surface of glassware is ground with a grinding wheel, applied at various directions of rotation with relation to the surface, to provide a continuous series of connected ground surfaces, which are then covered by a pigment or coloring of metallic lustre or appearance, giving the general effect of hammered metal, in the manner hereinafter described.

In the drawings, showing one application of the invention:

Fig. 1 is a partial face view of a piece of glassware provided with my improvement around its edge;

Fig. 2 is an enlarged plan view, showing in detail the preliminary grinding operation and effect;

Fig. 3 is a cross section on the line III—III of Fig. 2.

Fig. 4 is a similar view, showing another application of the cutting wheel;

Fig. 5 is a similar view, showing the pigment as applied.

In the article illustrated, the piece of ware 2, as a circular dish or the like, is provided with a decorated border 3 composed of the imitation hammered units 4. In carrying out the process, the surface of the edge portion 3, or any other surface, is ground against a rotating cutting wheel 5 of the kind used for cutting glass, with a convex surface 6 of desired diameter and transverse curvature to form the concave cutting of the several individual facets 7 over the area to be decorated. These unitary areas or facets 7 are ground by presenting the ware to the wheel 5 at various angles or positions so as to effect a continuous variation in their arrangement, changing the direction more or less for each individual cut. This variation is illustrated in Fig. 2, in which the direction of rotation of the wheel and its action on the ware is indicated by the direction or shading lines, as in Fig. 2.

When the entire surface to be decorated is thus ground in a series of closely adjacent or merged facets or reflecting units, there is a continuously variant light-reflecting surface provided, having a generally similar dull ground tone.

Upon such surface, any suitable pigment 8 it laid, as by a brush, in one or more layers, and may be baked or burnt in the usual manner customary with china or glass decoration or coloring. The color and quality of the pigment may be in any quality as desired, as silver, gold, copper, bronze, etc., and when finished, gives a color appearance closely simulating that of the corresponding or similar metal.

The general effect is that of hammered metal, and is very pleasing and distinctive. The process may be used with articles or vessels of any suitable design or shape, and may be greatly varied as to size, arrangement, or shape of the unitary facets, within the skill and taste of the operator.

What I claim is:

1. The method of decorating glassware in imitation of hammered metal consisting in grinding the surface to provide an area composed of closely adjacent facets, and covering the same with a suitable pigment.

2. The method of decorating glassware in imitation of hammered metal consisting in grinding the surface in varying directions to provide an area composed of closely adjacent facets, and covering the same with a suitable pigment.

3. The method of decorating glassware in imitation of hammered metal consisting in grinding the surface to provide an area composed of closely adjacent facets, each having a different outline and variant concavity, and then covering the same with a suitable pigment.

4. The method of decorating glassware in imitation of hammered metal consisting in grinding the surface to provide an area composed closely adjacent facets, each having a different outline and variant concavity, then covering the same with a suitable pigment, and then baking the ware.

In testimony whereof I hereunto affix my signature.

GUSTAV A. HORN.